(12) United States Patent
Ito

(10) Patent No.: US 7,295,381 B2
(45) Date of Patent: Nov. 13, 2007

(54) ZOOM LENS AND IMAGE PICKUP APPARATUS HAVING THE SAME

(75) Inventor: Daisuke Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/559,998

(22) Filed: Nov. 15, 2006

(65) Prior Publication Data

US 2007/0115558 A1 May 24, 2007

(30) Foreign Application Priority Data

Nov. 22, 2005 (JP) .............................. 2005-337029

(51) Int. Cl.
*G02B 15/14* (2006.01)
(52) U.S. Cl. ...................... 359/689; 359/691
(58) Field of Classification Search ................ 359/689, 359/691
See application file for complete search history.

(56) References Cited

U.S. PATENT DOCUMENTS

| 4,647,160 A | 3/1987 | Ikemori |
| 4,810,072 A | 3/1989 | Takahashi |
| 4,838,666 A | 6/1989 | Shiraishi |
| 5,270,863 A | 12/1993 | Uzawa |
| 7,042,651 B2 | 5/2006 | Kuba et al. |

FOREIGN PATENT DOCUMENTS

| JP | 59-018917 A | 1/1984 |
| JP | 61-267721 A | 11/1986 |
| JP | 63-135913 A | 6/1988 |
| JP | 03-288113 A | 12/1991 |
| JP | 07-261083 A | 10/1995 |
| JP | 2004-094283 A | 3/2004 |
| JP | 2004-239974 A | 8/2004 |
| JP | 2004-318104 A | 11/2004 |
| JP | 2005-055496 A | 3/2005 |

*Primary Examiner*—Scott J. Sugarman
*Assistant Examiner*—James R Greece
(74) *Attorney, Agent, or Firm*—Canon USA, Inc., IP Division

(57) ABSTRACT

At least one exemplary embodiment is directed to a zoom lens, which includes, in order from an object side to an image side, a first lens unit of negative refractive power, and a second lens unit of positive refractive power. An interval between the first and second lens units changes during zooming. The first lens unit includes a negative lens and a positive lens in order from the object side to the image side. A refractive index of a material of the negative lens, a refractive index of a material of the positive lens, a focal length of the first lens unit satisfy appropriate conditions.

11 Claims, 11 Drawing Sheets

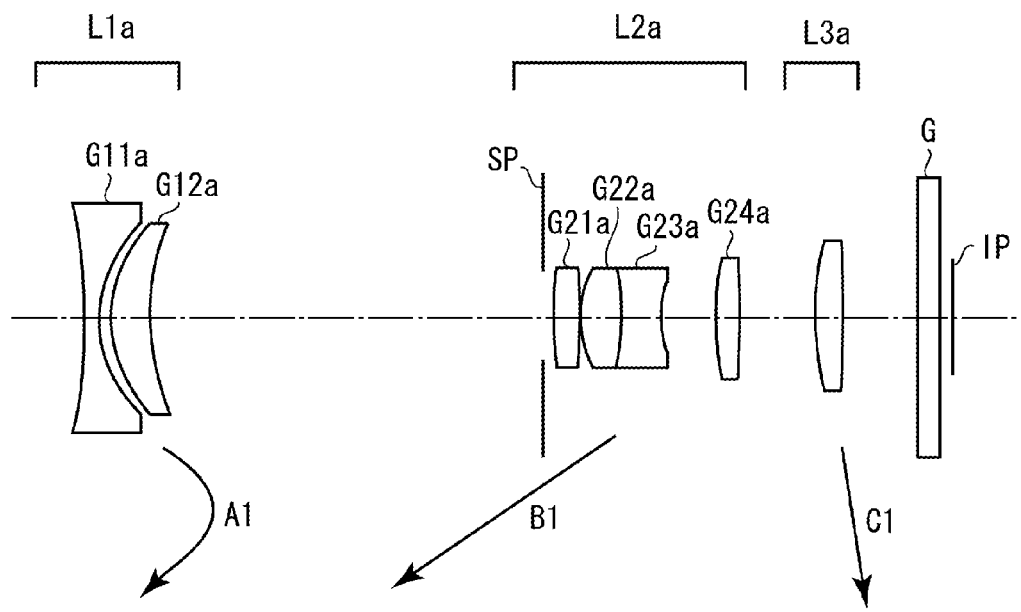
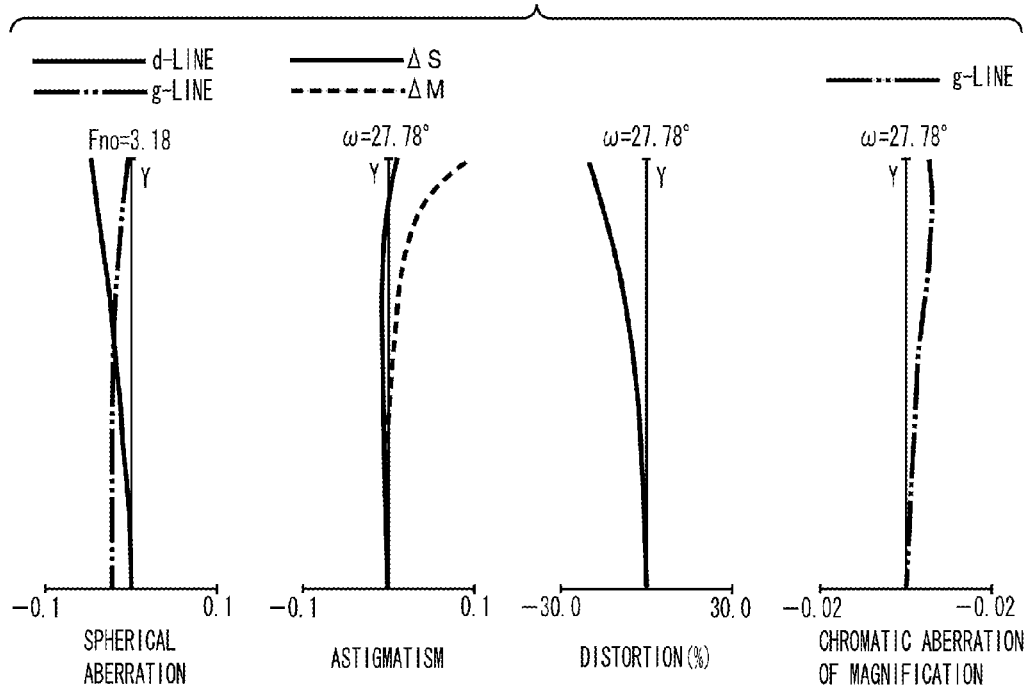

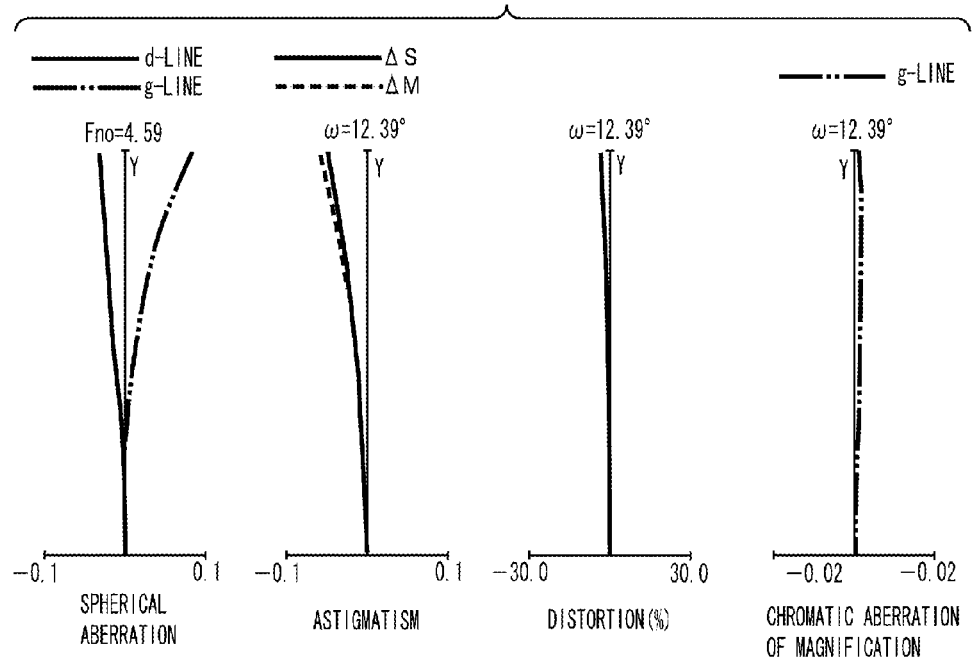
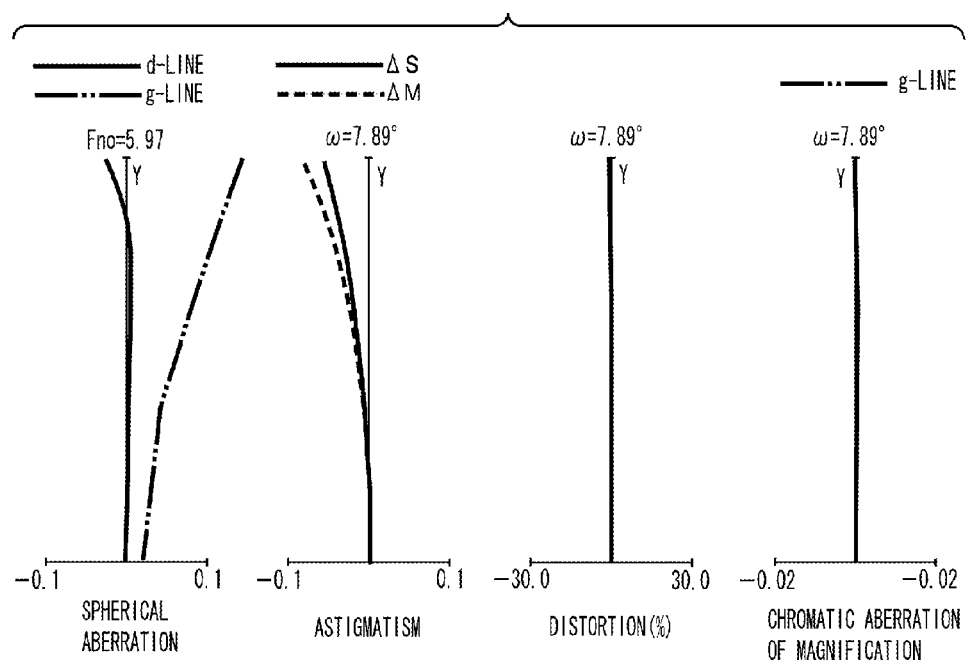

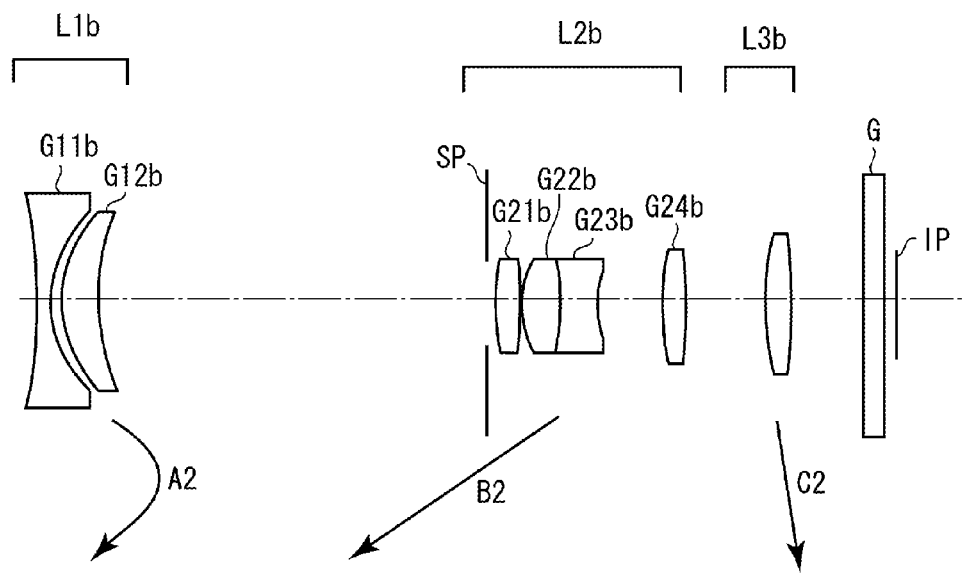
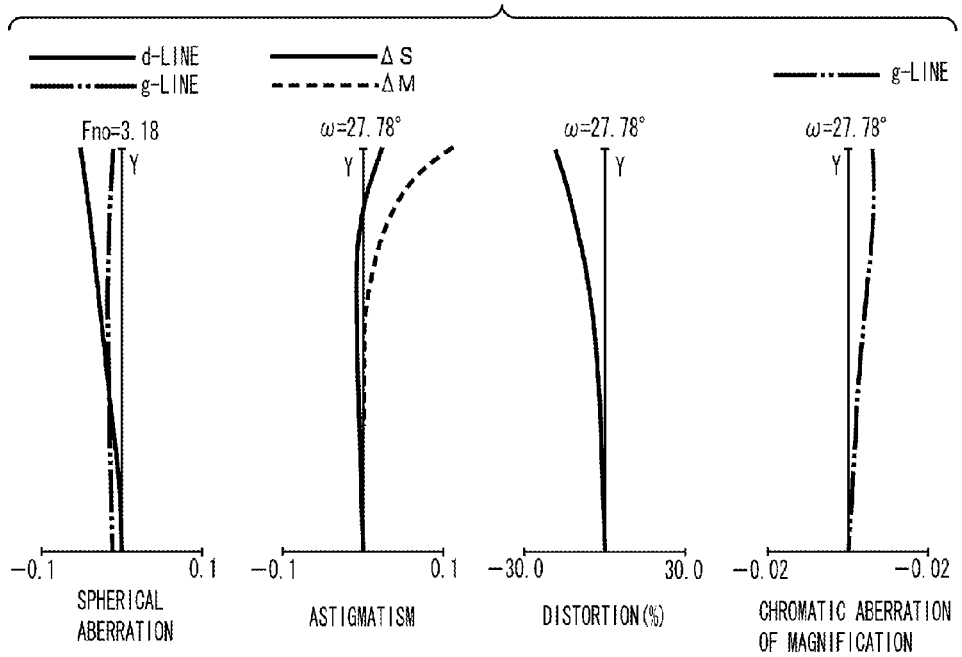

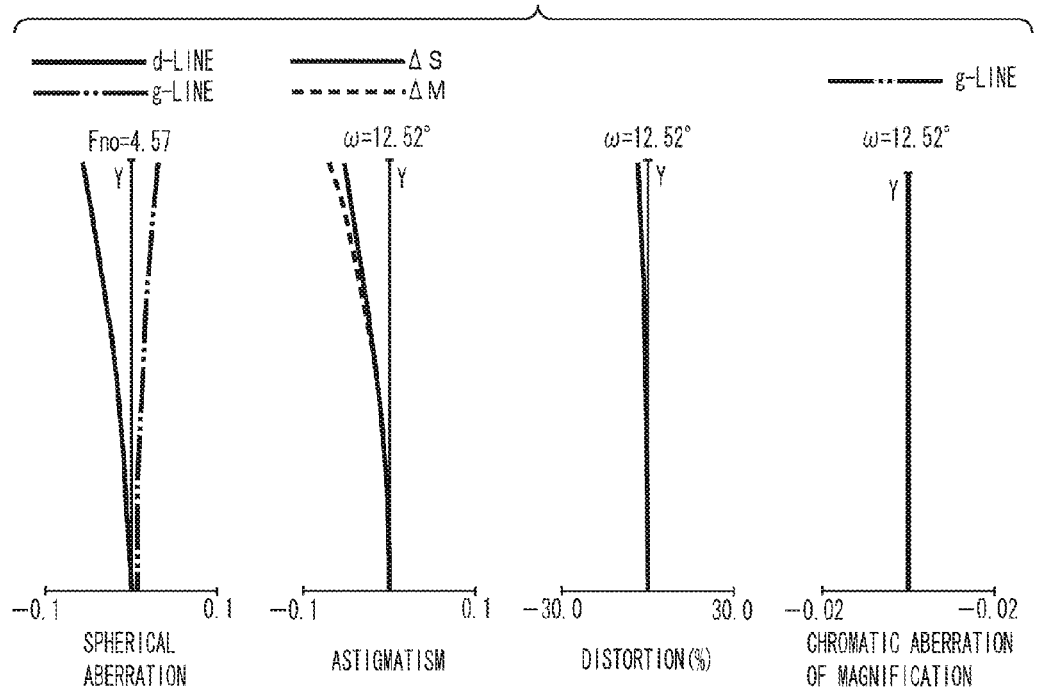
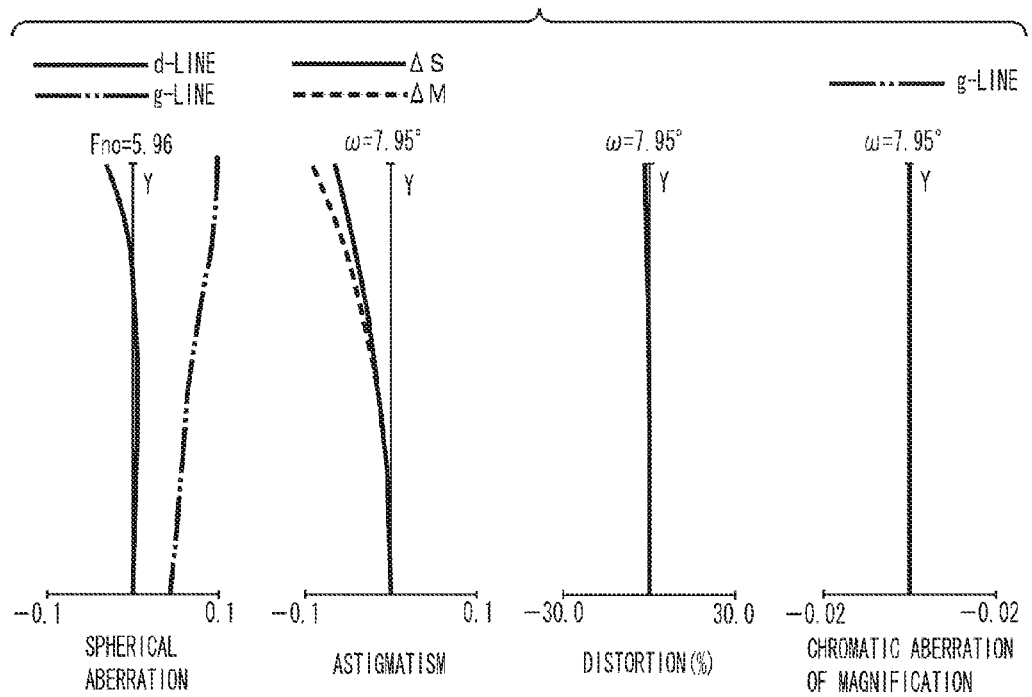

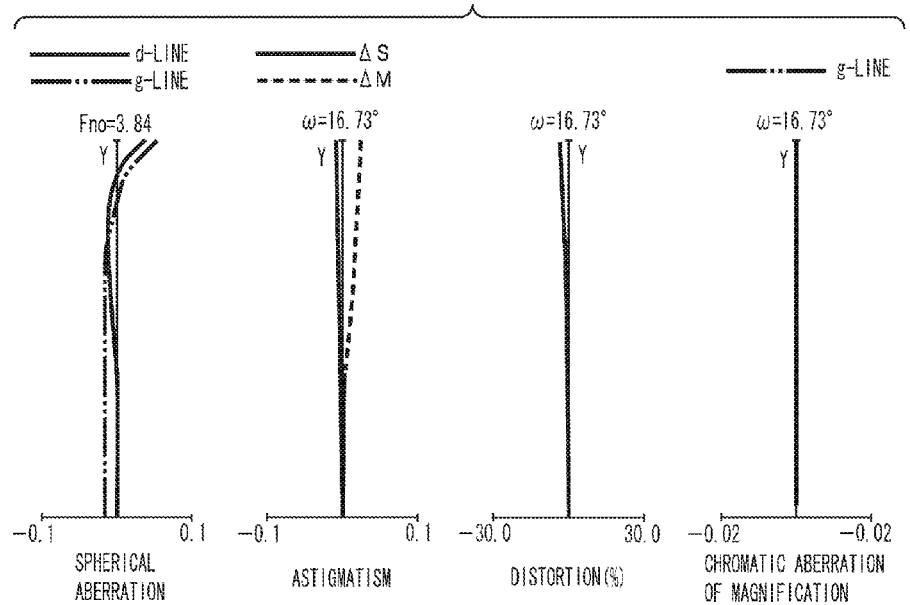
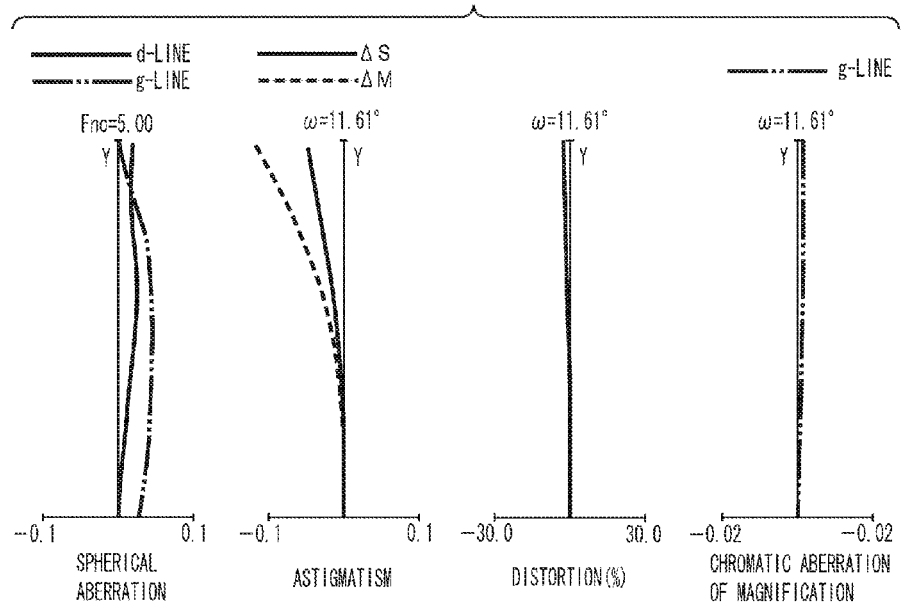

ZOOM LENS AND IMAGE PICKUP APPARATUS HAVING THE SAME

BACKGROUND OF THE INVENTION

1. Field of the Invention

The present invention relates to a zoom lens, and more particularly, though not exclusively, a zoom lens that can be used in a still camera, a video camera, and a digital still camera and an image pickup apparatus having the zoom lens.

2. Description of the Related Art

In recent years, the market has desired image pickup apparatuses (e.g., cameras), such as a video camera and a digital still camera that use a solid-state image sensor, that have advanced functions and have thin body thicknesses. In addition, the market has desired that an optical system (e.g., a shooting optical system) that is used in the camera be a small zoom lens that has a reduced number of lens elements and has a high optical performance.

In such a type of camera, various types of optical members such as a low-pass filter and a color correction filter are disposed between a rearmost portion of the lens and the image sensor. Accordingly, it is desired that a zoom lens that is used for the above-mentioned camera has a relatively long back focal distance.

Conventionally, there have been proposed various short zoom type two-unit zoom lenses having a wide angle of field that include a first lens unit having a negative refractive power and a second lens unit having a positive refractive power and are configured to perform zooming by changing a lens interval between the lens units.

In the two-unit zoom lens, the second lens unit, having a positive refractive power, is moved to perform variation of magnification and the first lens unit, having a negative refractive power, is moved to compensate for variation of an image point position caused by the variation of magnification. Most two-unit zoom lenses have a zoom magnification (zoom ratio) of about 2.

A small zoom lens having a zoom ratio of 2 or higher includes a three-unit zoom lens in which a third lens unit, having a negative or positive refractive power, is located on an image side of the two-unit zoom lens. Japanese Patent Application Laid-Open No. 61-267721 and Japanese Patent Application Laid-Open No. 59-18917 discuss a three-unit zoom lens in which various kinds of aberrations occurring due to high zoom magnification are corrected by the third lens unit.

In addition, Japanese Patent Application Laid-Open No. 63-135913 and Japanese Patent Application Laid-Open No. 7-261083 discuss a three-unit zoom lens having a long back focal distance and a wide angle of field while securing good telecentric characteristics.

In addition, Japanese Patent Application Laid-Open No. 3-288113 discusses a three-unit zoom lens in which zooming is performed by moving a second lens unit, having a positive refractive power, and a third lens unit, having a positive refractive power, while maintaining a first lens unit, having a negative refractive power, stationary.

In addition, Japanese Patent Application Laid-Open No. 2004-94283, Japanese Patent Application Laid-Open No. 2004-239974, Japanese Patent Application Laid-Open No. 2004-318104, and Japanese Patent Application Laid-Open No. 2005-55496 discuss a small three-unit zoom lens in which a first lens unit includes two lens elements.

In addition, a conventional zoom lens used for an image pickup apparatus with a solid-state image sensor includes a small three-unit zoom lens in which various kinds of aberrations are corrected with an aspheric surface applied to a first lens unit so as to reduce the number of constituent lens elements.

Meanwhile, some conventional image pickup apparatuses are configured to electrically correct distortion among various kinds of aberrations using image processing instead of optically correcting distortion.

A zoom lens for a single-lens reflex camera that is designed for 35 mm film has a too long back focal distance to be applied to an optical apparatus (camera) that uses a solid-state image sensor. In addition, the zoom lens of this kind does not have good telecentric characteristics. Accordingly, if a zoom lens, for a single-lens reflex camera that is designed for 35 mm film, is directly applied to an optical apparatus that uses a solid-state image sensor, a phenomenon of shading occurs.

In recent years, attempts have been made to both implement the downsizing of a camera and increase the zoom magnification of a zoom lens that is used for the camera. The method for implementing the downsizing of a camera and increasing the zoom magnification includes a so-called lens retraction method. In the lens retraction method, the interval between lens units in a non-photographing state is reduced to an interval that is different from the interval in a photographing state so as to reduce the amount of protrusion of the lens from the camera body.

As the number of lens elements of each lens unit that constitutes a zoom lens is large, the length of each lens unit along an optical axis becomes large (that is, the whole length of the zoom lens becomes large). In addition, when the amount of movement of each lens unit during zooming or focusing is large, the whole length of the zoom lens becomes large. As a result, a desired length of the zoom lens with the lens units retracted cannot be obtained. Accordingly, it becomes difficult to utilize the lens retraction method. That is, as the zoom ratio of a zoom lens becomes higher, the whole length of the zoom lens becomes larger, and accordingly, it becomes difficult to apply the lens retraction method.

On the other hand, if one or more aspheric lenses are used in a zoom lens, the total number of constituent lens elements of the zoom lens can be reduced. Accordingly, the whole length of the zoom lens can be shortened. However, an aspheric lens is more difficult to manufacture than a spherical lens. In particular, an aspheric lens having a large effective diameter is more difficult to manufacture. Accordingly, increasing the number of aspheric lenses used in an optical apparatus or using an aspheric lens having a large effective diameter in an optical apparatus may cause a difficulty in manufacturing.

Accordingly, it is desirable that an aspheric lens is applied to a lens having as small an effective diameter as possible.

In general, it is relatively easy to realize a wide angle of view in a two-unit zoom lens that has a first lens unit, having a negative refractive power, and a second lens unit, having a positive refractive power, in order from an object side to an image side or in a three-unit zoom lens in which a lens unit having a positive or negative refractive power is disposed on the image side of the two-unit zoom lens. In addition, in this type of two-unit or three-unit zoom lens, a given back focal distance can readily be attained.

However, in configuring the whole lens system with a small number of lens elements while securing a good optical performance, it can be necessary to appropriately set the arrangement of refractive power of each lens unit and the shape of each lens element.

In particular, if the lens configuration of a first lens unit, whose effective diameter tends to be large, is set inappropriate, it is difficult to miniaturize the whole lens system while securing a high optical performance.

SUMMARY OF THE INVENTION

At least one exemplary embodiment of the present invention is directed to a zoom lens having a small number of constituent lens elements and having a high optical performance while sufficiently correcting various aberrations other than distortion, and is also directed to an image pickup apparatus having that zoom lens.

According to an aspect of at least one exemplary embodiment of the present invention, a zoom lens includes, in order from an object side to an image side, a first lens unit having a negative refractive power, and a second lens unit having a positive refractive power. An interval between the first lens unit and the second lens unit changes during zooming. The first lens unit includes a negative lens and a positive lens in order from the object side to the image side. A refractive index of a material of the negative lens ($n1$), a refractive index of a material of the positive lens ($n2$), a focal length of the first lens unit ($f1$), a power of an air lens between the negative lens and the positive lens ($\phi air$), a radius of curvature of a surface facing the object side of the negative lens ($r1a$), a radius of curvature of a surface facing the image side of the negative lens ($r1b$), a radius of curvature of a surface facing the object side of the positive lens ($r2a$), and a radius of curvature of a surface facing the image side of the positive lens ($r2b$) satisfy the following conditions:

$$0.10 < n2 - n1 < 0.35$$

$$-0.80 < \phi air \cdot f1 < -0.10$$

$$-50 < (r1b + r2a)/(r1b - r2a) < -8$$

$$0.25 < (r1a + r2b)/(r1a - r2b) < 0.80.$$

According to another aspect of at least one exemplary embodiment of the present invention, an image pickup apparatus includes a photoelectric conversion element, and a zoom lens configured to guide a light flux from an object to the photoelectric conversion element. The zoom lens includes, in order from the object side to the photoelectric conversion element side, a first lens unit having a negative refractive power, and a second lens unit having a positive refractive power. An interval between the first lens unit and the second lens unit changes during zooming. The first lens unit includes a negative lens and a positive lens in order from the object side to the photoelectric conversion element side. A refractive index of a material of the negative lens ($n1$), a refractive index of a material of the positive lens ($n2$), a focal length of the first lens unit ($f1$), a power of an air lens between the negative lens and the positive lens ($\phi air$), a radius of curvature of a surface facing the object side of the negative lens ($r1a$), a radius of curvature of a surface facing the photoelectric conversion element side of the negative lens ($r1b$), a radius of curvature of a surface facing the object side of the positive lens ($r2a$), and a radius of curvature of a surface facing the photoelectric conversion element side of the positive lens ($r2b$) satisfy the following conditions:

$$0.10 < n2 - n1 < 0.35$$

$$-0.80 < \phi air \cdot f1 < -0.10$$

$$-50 < (r1b + r2a)/(r1b - r2a) < -8$$

$$0.25 < (r1a + r2b)/(r1a - r2b) < 0.80.$$

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate some exemplary embodiments and features of the invention and, together with the description, serve to explain some of the principles of the invention.

FIG. 1 is a cross section of a zoom lens according to a first exemplary embodiment of the present invention.

FIG. 2 is an aberration chart of the zoom lens at the wide-angle end according to the first exemplary embodiment of the present invention.

FIG. 3 is an aberration chart of the zoom lens at a middle focal length according to the first exemplary embodiment of the present invention.

FIG. 4 is an aberration chart of the zoom lens at the telephoto end according to the first exemplary embodiment of the present invention.

FIG. 5 is a cross section of a zoom lens according to a second exemplary embodiment of the present invention.

FIG. 6 is an aberration chart of the zoom lens at the wide-angle end according to the second exemplary embodiment of the present invention.

FIG. 11 is an aberration chart of the zoom lens at a middle focal length according to the third exemplary embodiment of the present invention.

FIG. 12 is an aberration chart of the zoom lens at the telephoto end according to the third exemplary embodiment of the present invention.

FIG. 15 is an aberration chart of the zoom lens at a middle focal length according to the fourth exemplary embodiment of the present invention.

FIG. 16 is an aberration chart of the zoom lens at the telephoto end according to the fourth exemplary embodiment of the present invention.

DETAILED DESCRIPTION OF THE EMBODIMENTS

Figure 7:
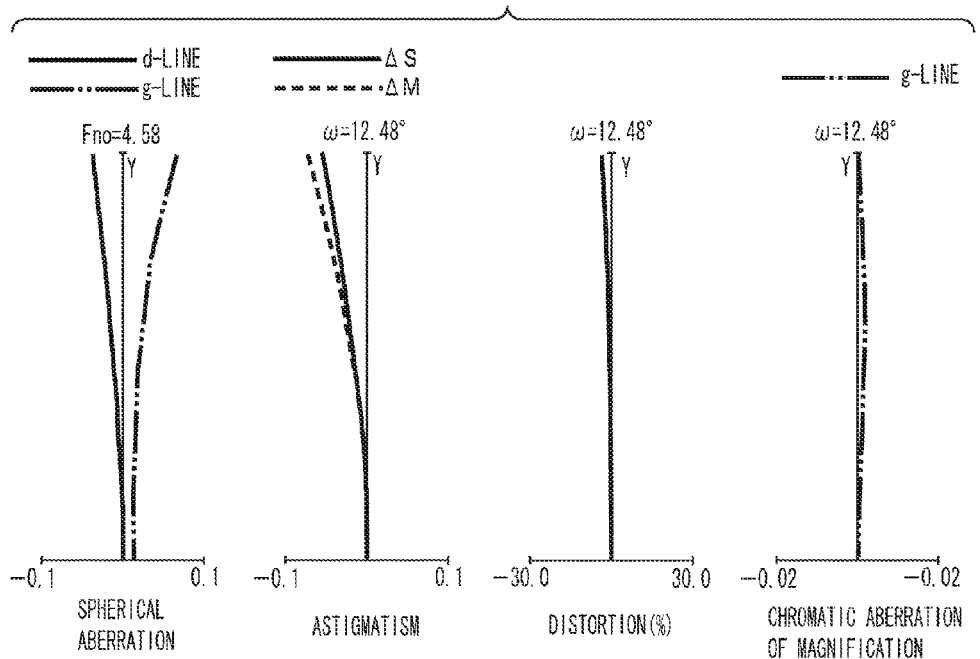
FIG. 7 is an aberration chart of the zoom lens at a middle focal length according to the second exemplary embodiment of the present invention.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

FIG. 1 is a diagram that illustrates a cross section of a zoom lens at the wide-angle end according to a first exemplary embodiment of the present invention. FIG. 2, FIG. 3, and FIG. 4 respectively show an aberration chart at the wide-angle end, an aberration chart at a middle zooming position, and an aberration chart at the telephoto end of the zoom lens according to the first exemplary embodiment of the present invention. The first exemplary embodiment is directed to a zoom lens having a zoom ratio of about 3.8 and an aperture ratio ranging from about 3.2 to about 6.

Figure 8:
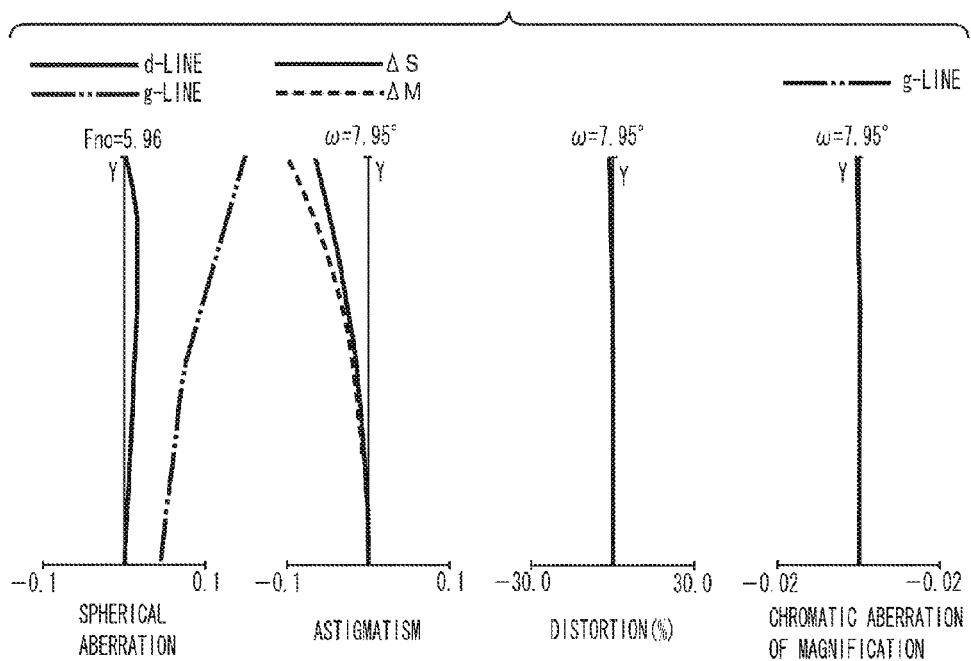
FIG. 8 is an aberration chart of the zoom lens at the telephoto end according to the second exemplary embodiment of the present invention.

FIG. 5 is a diagram that illustrates a cross section of the zoom lens at the wide-angle end according to a second exemplary embodiment of the present invention. FIG. 6, FIG. 7, and FIG. 8 respectively show an aberration chart at the wide-angle end, an aberration chart at a middle zooming position, and an aberration chart at the telephoto end of the zoom lens according to the second exemplary embodiment of the present invention. The second exemplary embodiment is directed to a zoom lens having a zoom ratio of about 3.8 and an aperture ratio ranging from about 3.2 to about 6.

Figure 9:
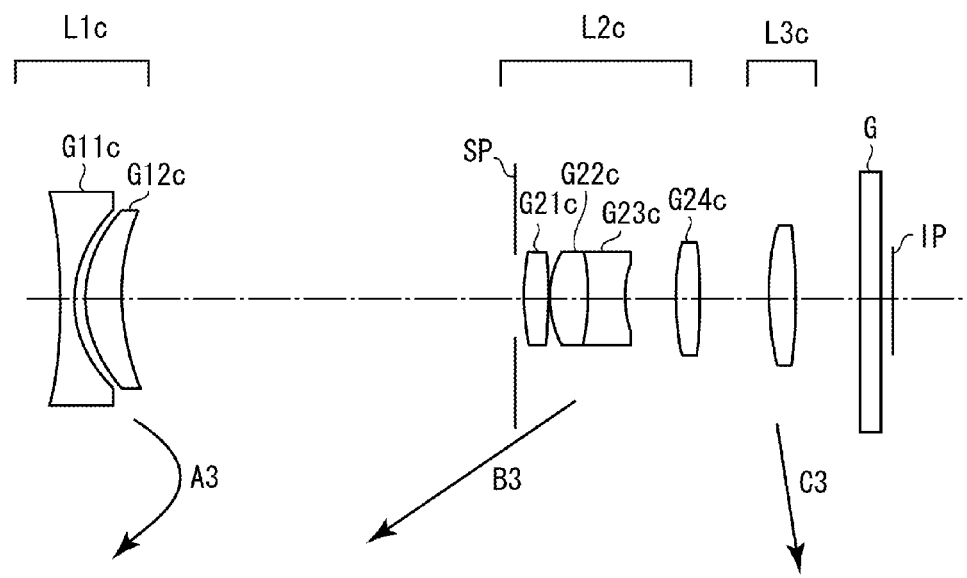
FIG. 9 is a cross section of a zoom lens according to a third exemplary embodiment of the present invention.
Figure 10:
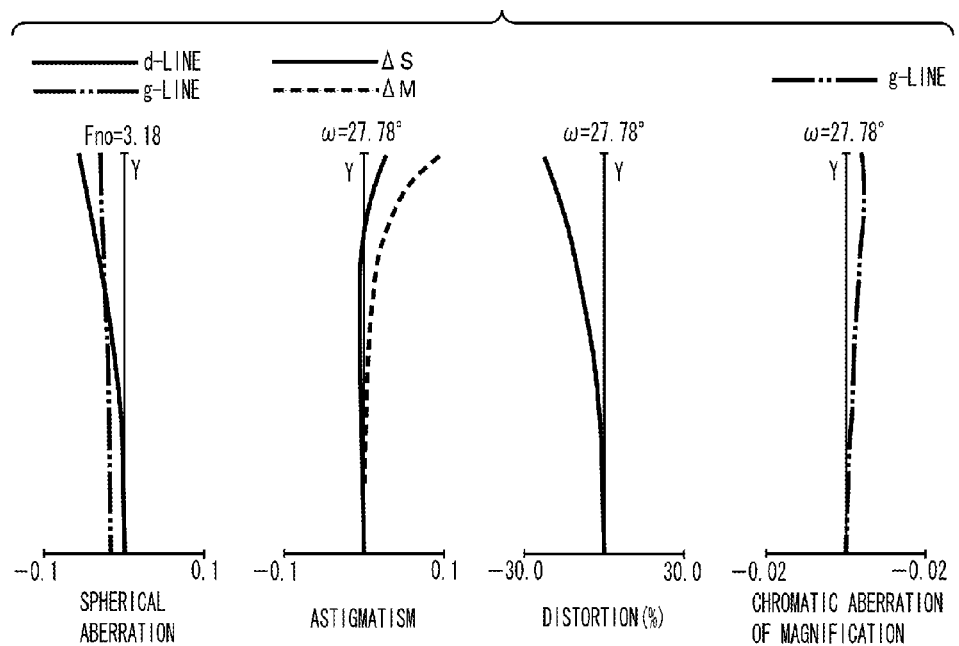
FIG. 10 is an aberration chart of the zoom lens at the wide-angle end according to the third exemplary embodiment of the present invention.

FIG. 9 is a diagram that illustrates a cross section of the zoom lens at the wide-angle end according to a third exemplary embodiment of the present invention. FIG. 10, FIG. 11, and FIG. 12 respectively show an aberration chart at the wide-angle end, an aberration chart at a middle zooming position, and an aberration chart at the telephoto end of the zoom lens according to the third exemplary embodiment of the present invention. The third exemplary embodiment is directed to a zoom lens having a zoom ratio of about 3.8 and an aperture ratio ranging from about 3.2 to about 6.

Figure 13:
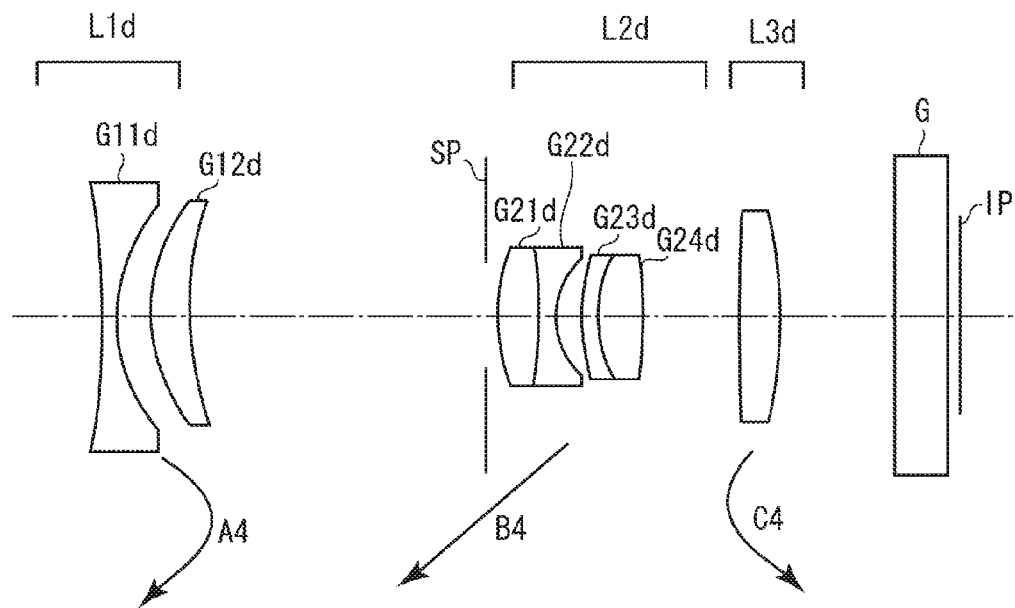
FIG. 13 is a cross section of a zoom lens according to a fourth exemplary embodiment of the present invention.
Figure 14:
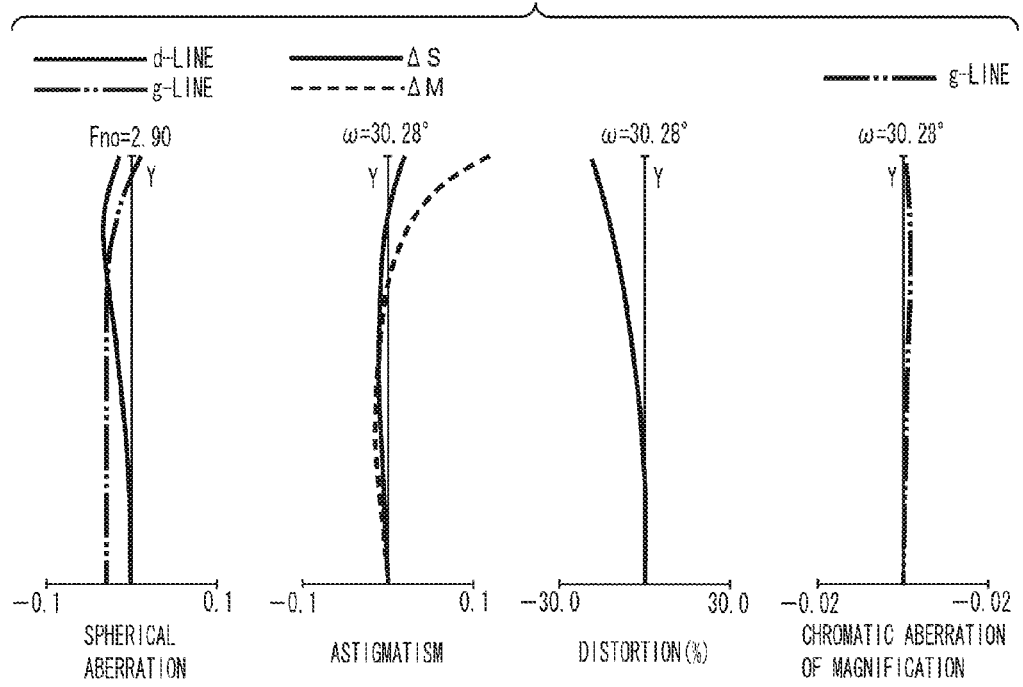
FIG. 14 is an aberration chart of the zoom lens at the wide-angle end according to the fourth exemplary embodiment of the present invention.

FIG. 13 is a diagram that illustrates a cross section of the zoom lens at the wide-angle end according to a fourth exemplary embodiment of the present invention. FIG. 14, FIG. 15, and FIG. 16 respectively show an aberration chart at the wide-angle end, an aberration chart at a middle zooming position, and an aberration chart at the telephoto end of the zoom lens according to the fourth exemplary embodiment of the present invention. The fourth exemplary embodiment is directed to a zoom lens having a zoom ratio of about 2.8 and an aperture ratio ranging from about 2.9 to about 5.

Figure 17:
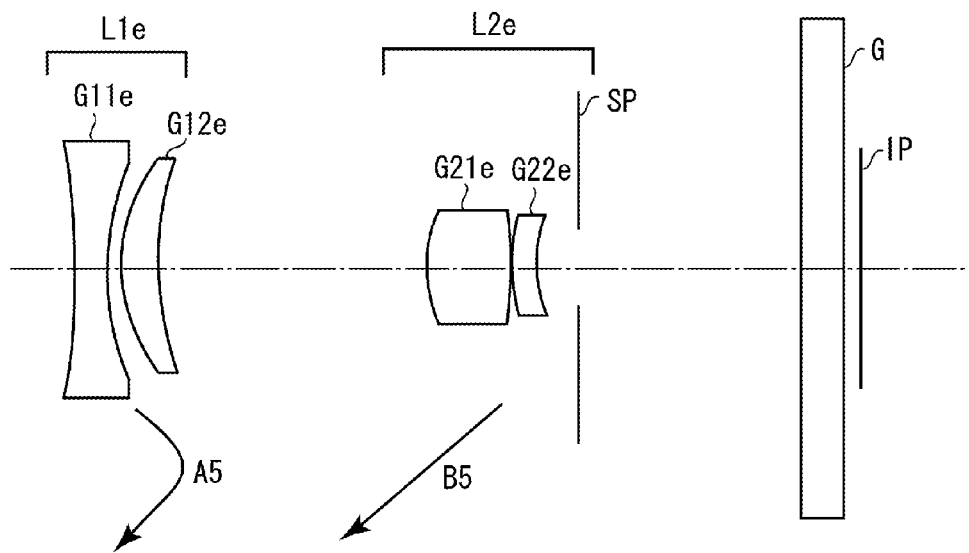
FIG. 17 is a cross section of a zoom lens according to a fifth exemplary embodiment of the present invention.
Figure 18:
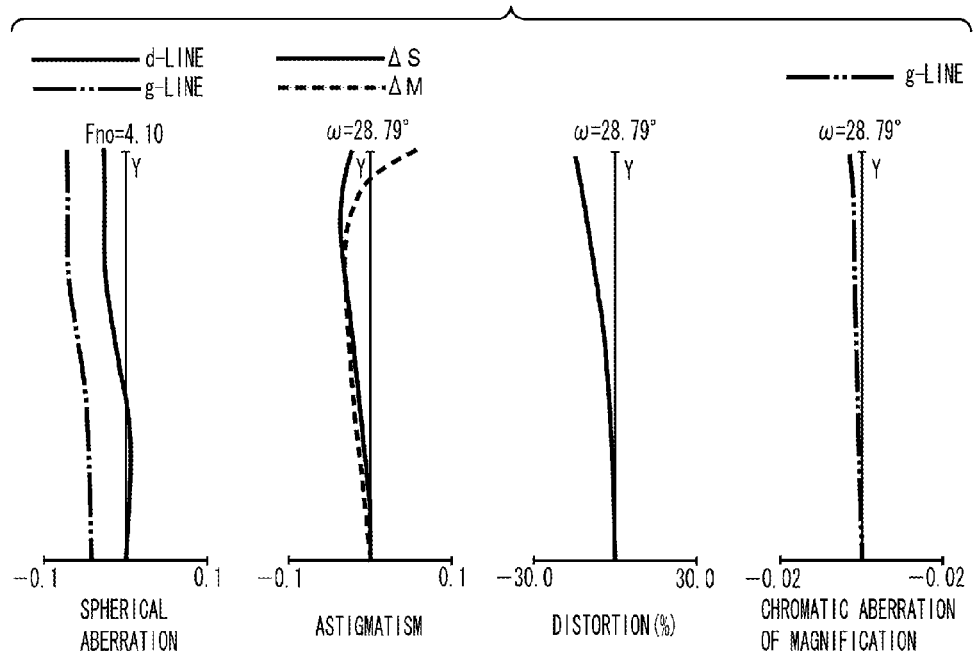
FIG. 18 is an aberration chart of the zoom lens at the wide-angle end according to the fifth exemplary embodiment of the present invention.
Figure 19:
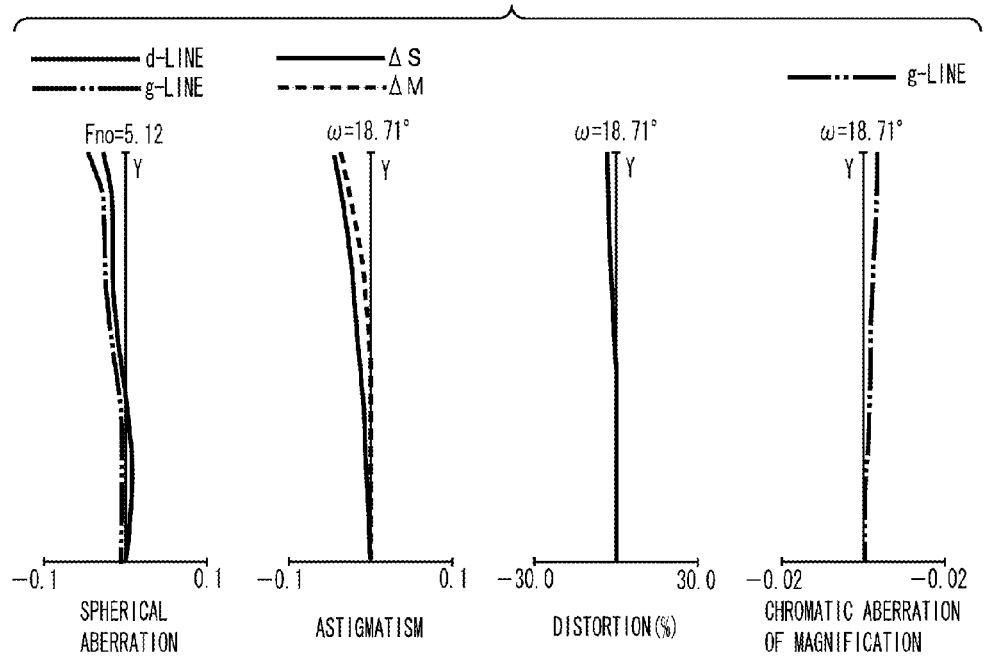
FIG. 19 is an aberration chart of the zoom lens at a middle focal length according to the fifth exemplary embodiment of the present invention.
Figure 20:
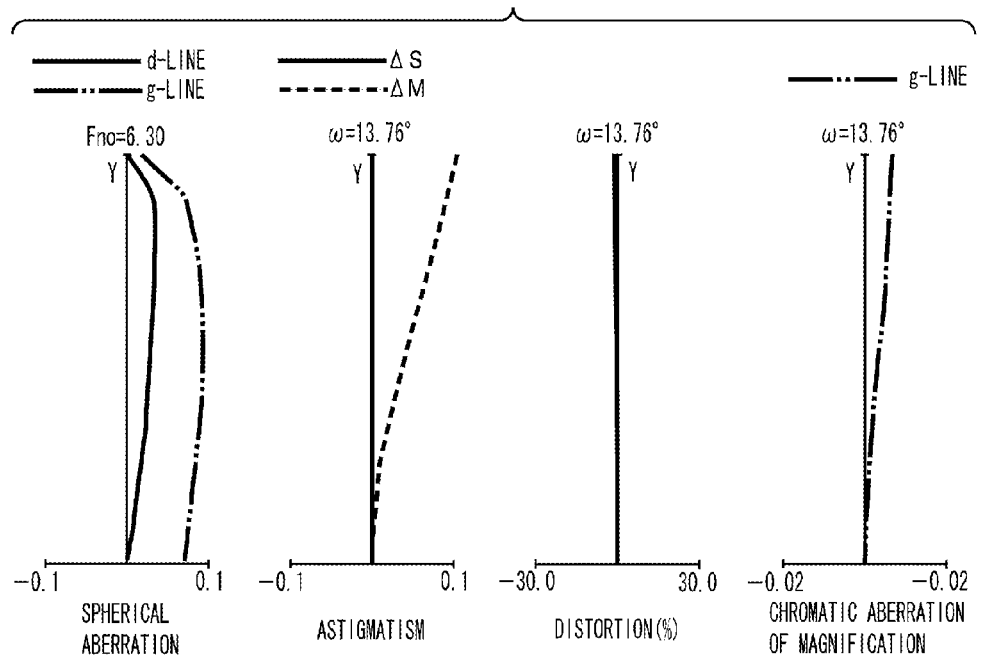
FIG. 20 is an aberration chart of the zoom lens at the telephoto end according to the fifth exemplary embodiment of the present invention.

FIG. 17 is a diagram that illustrates a cross section of the zoom lens at the wide-angle end according to a fifth exemplary embodiment of the present invention. FIG. 18, FIG. 19, and FIG. 20 respectively show an aberration chart at the wide-angle end, an aberration chart at a middle zooming position, and an aberration chart at the telephoto end of the zoom lens according to the fifth exemplary embodiment of the present invention. The fifth exemplary embodiment is directed to a zoom lens having a zoom ratio of about 2.2 and an aperture ratio ranging from about 4.1 to about 6.3.

Figure 21:
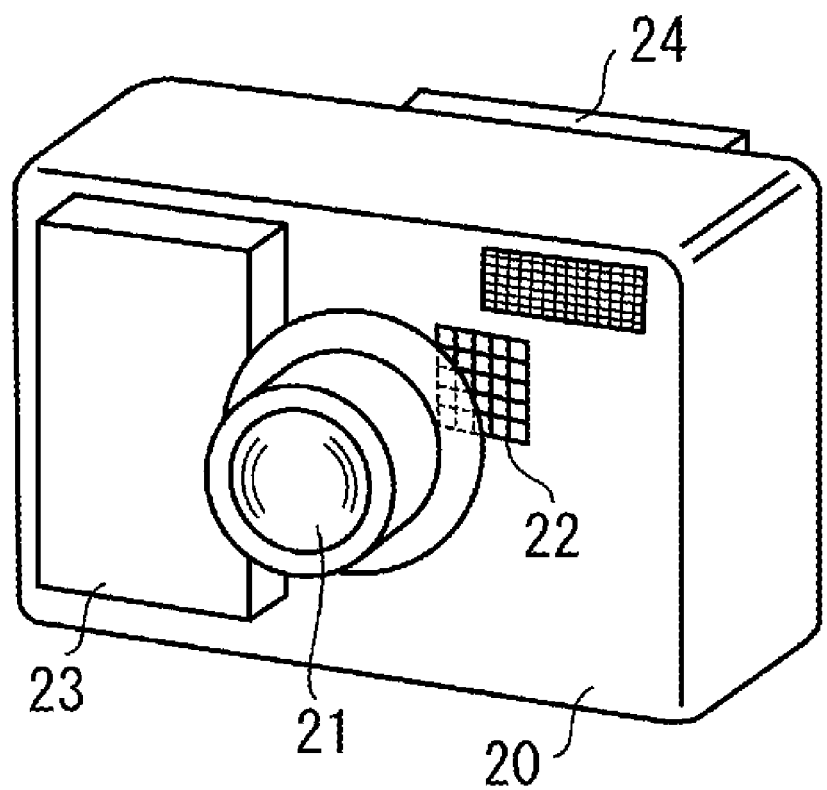
FIG. 21 is a diagram illustrating components of an image pickup apparatus according to an exemplary embodiment of the present invention.

FIG. 21 is a schematic diagram illustrating components of a digital still camera (an example of an image pickup apparatus) having a zoom lens according to an exemplary embodiment of the present invention.

The zoom lens according to each of the exemplary embodiments described above is a photographic lens system, which can be used with an image pickup apparatus. In using the zoom lens according to each exemplary embodiment as a photographing optical system of a video camera or a digital still camera, an object image is formed (a light flux from the object is guided) on an imaging plane of a solid-state image sensor (photoelectric conversion element), such as a charge-coupled device (CCD) sensor and a complementary metal-oxide semiconductor (CMOS) sensor.

In each of the diagrams showing a cross section of a zoom lens, an object side (front side) is shown at a left-hand portion of the drawing, and an image side (back side) is shown at a right-hand portion thereof. Referring to each of the diagrams showing a cross section of a zoom lens, the zoom lens includes a first lens unit L1$a$-$e$ having a negative refractive power (optical power: an inverse of a focal length) and a second lens unit L2$a$-$e$ having a positive refractive power. According to an exemplary embodiment of the present invention, the zoom lens can include a third lens unit L3$a$-$d$ having a positive refractive power. The zoom lens can further include an aperture stop SP that is positioned on the object side or the image side of the second lens unit L2$a$-$e$. In each of the diagrams showing a cross section of a zoom lens, "G" denotes a glass block that is equivalent to an optical filter and a face plate, and "IP" denotes an image plane.

In each of the aberration charts, "d" and "g" respectively denote d-line and g-line light. "$\Delta M$" and "$\Delta S$" respectively denote a meridional image plane and a sagittal image plane. Chromatic aberration of magnification is represented with g-line light. "Fno" denotes an F number, and "$\omega$" denotes a semifield angle. The Y-axis in the spherical aberration's graph is entrance pupil radius, the Y-axis in the astigmatism's, distortion's and chromatic aberration of magnification's graphs is image height.

Note that in each of the above exemplary embodiments, each of the wide-angle end and the telephoto end refers to a zooming position when a lens unit for varying magnification (the second lens unit L2a-e) is positioned at each of the ends of a range in which the second lens unit L2a-e can mechanically move along an optical axis.

The zoom lens according to each exemplary embodiment includes, as its basic configuration, two or more lens units, including the first lens unit L1a-e having a negative refractive power and the second lens unit L2a-e having a positive refractive power, in order from the object side to the image side. In addition, as the basic configuration of the zoom lens, during zooming from the wide-angle end to the telephoto end, the first lens unit L1a-e moves (A1-A5) with a locus convex toward the image side and the second lens unit L2a-e moves (B1-B5) toward the object side monotonously.

In each exemplary embodiment, the first lens unit L1a-e performs focusing.

In a zoom lens according to the first through the third exemplary embodiments, variation of magnification is mainly performed by moving (B1-B3) the second lens unit L2a-c. In addition, zooming from the wide-angle end to the telephoto end is performed by moving (A1-A3) the first lens unit L1a-c with the convex locus and moving (C1-C3) the third lens unit L3a-c toward the image side. The first lens unit L1a-c moves to compensate for movement (variation) of an image plane caused by the variation of magnification.

A zoom lens according to the fourth exemplary embodiment performs main variation of magnification by moving (B4) the second lens unit L2d.

In addition, the zoom lens according to the fourth exemplary embodiment compensates for movement of an image plane caused by the variation of magnification by moving (A4) the first lens unit L1d with a convex locus and moving (C4) the third lens unit L3d with a locus convex toward the object side.

The fifth exemplary embodiment is directed to a zoom lens including two lens units, in which main variation of magnification is performed by moving (B5) the second lens unit L2e. In addition, the first lens unit L1e moves (A5) with a convex locus so as to compensate for movement of an image plane caused by the variation of magnification.

In each exemplary embodiment, the first lens unit L1a-e includes two lenses, i.e., in order from the object side to the image side, a negative lens G11a-e whose both lens surfaces can be in a concave shape and a positive lens G12a-e which can have a meniscus shape and whose surface on the image side can have a concave shape.

With the configuration of each first lens unit L1a-e as described above, the length of the zoom lens with lens units retracted can be shortened with a miniaturized lens system.

In addition, in each exemplary embodiment, the first lens unit L1a-e, whose effective diameter is largest in all of the lens units, can be configured with only spherical lenses so as to facilitate manufacturing lens elements.

The first lens unit L1a-e serves to cause an off-axial principal ray to be pupil-imaged on the center of the aperture stop SP. With respect to the first lens unit L1a-e, the amount of refraction of an off-axis principal ray is large at the wide-angle side. Accordingly, off-axial aberrations, especially, astigmatism and distortion, can occur.

In this regard, in each exemplary embodiment, similar to an ordinary wide-angle lens system, the first lens unit L1a-e includes the negative lens G11a-e and the positive lens G12a-e in order that an increase in the effective diameter of the lens disposed closest to the object side is suppressed.

In addition, each surface of the positive lens G12a-e disposed behind the image side of the negative lens G11a-e of the first lens unit L1a-e can be in a nearly concentric sphere shape centered on a point of intersection of the aperture stop SP and the optical axis in order that off-axial aberration occurring due to the refraction of an off-axial principal ray can be suppressed.

In addition, the surface of the negative lens G11a-e on the object side can be in a concave shape so as to mainly prevent a field curvature from occurring.

Furthermore, in addition to the above-described surface shape of each lens of the first lens unit L1a-e, the negative lens G11a-e and the positive lens G12a-e each are made of a material having an appropriate refractive index. In addition, each interval between lens units are appropriately set. Thus, occurrence of various aberrations other than distortion can be suppressed to a minimum.

Additionally, in the first through the third exemplary embodiments, the second lens unit L2a-c includes three lens units with four lens elements. More specifically, the second lens unit L2a-c includes a positive lens G21a-c whose both lens surfaces can have a convex shape, a positive lens G22a-c whose both lens surfaces can have a convex shape, a negative lens G23a-c whose both lens surfaces can have a concave shape, and a positive lens G24a-c. The positive lens G22a-c and the negative lens G23a-c can be cemented to each other. With the above-described configuration of the second lens unit L2a-c, a refractive angle of an off-axial ray emerging from the first lens unit L1a-c can be reduced to reduce the amount of various off-axial aberrations.

In addition, the positive lens G21a-c is a lens through which an axial ray passes at the largest height and which contributes mainly to the correction of spherical aberration and coma. In addition, a surface on the image side of the negative lens G23a-c cemented to the positive lens G22a-c can have a concave shape so that aberration occurring in the positive lens G21a-c and the positive lens G22a-c can be canceled.

In the fourth exemplary embodiment, the second lens unit L2d includes two lens units with four lens elements. More specifically, the second lens unit L2d includes a positive lens G21d having a convex shape whose absolute value of refractive power is larger on the object side surface than on the image side surface, a negative lens G22d whose both lens surfaces have a concave shape, a negative lens G23d, and a positive lens G24d.

In addition, the positive lens G21d and the negative lens G22d can be cemented to each other.

Further, the negative lens G23d and the positive lens G24d can be cemented to each other.

In the fourth exemplary embodiment, the positive lens G21d has a lens shape that enables a refractive angle of an off-axial ray emerging from the first lens unit L1d to be reduced so as to reduce various aberrations.

In addition, the positive lens G21d is a lens through which an off-axial ray passes at a large height and which contributes mainly to the correction of spherical aberration and coma. Accordingly, the lens surface of the positive lens G21d on the object side can have an aspheric shape in which the positive refractive index becomes smaller toward the marginal portion thereof. With the above-described configuration of the positive lens G21d, spherical aberration and coma can be appropriately corrected.

In addition, the positive lens G21d and the negative lens G22d can be cemented to each other so as to form a cemented lens having a positive refractive power as a whole.

In addition, with the negative lens G23d and the positive lens G24d used as well, that is, with four lens elements in total, an aberration variation occurring due to zooming can be suppressed. A useful effect of the above-described configuration is equivalent to the effect obtained by separating the refractive power of a negative lens component in a so-called triplet type lens into two components. That is, the flexibility in correcting aberration is improved compared to the case of a method for correcting aberration using a single negative lens component as in the case of the triplet type. Thus, the correction of off-axial flare, which is conventionally corrected by increasing the thickness of glass of a negative lens component, is not necessary.

In addition, with two air lenses having a negative refractive power disposed across the negative lens component, the correction of spherical aberration is not necessary. Thus, compared to the case of the triplet type, it is easier to reduce the thickness of the second lens unit L2d so as to readily shorten the total length of the optical system and to shorten the total length of lens units during lens retraction.

In the fifth exemplary embodiment, the second lens unit L2e includes two lens units with two lens elements. More specifically, the second lens unit L2e includes a positive lens G21e whose both surfaces can have a convex shape and whose absolute value of refractive power is larger on the object side surface than on the image side surface, and a negative lens G22e. With the above-described configuration of the positive lens G21e, a refractive angle of an off-axial ray emerging from the first lens unit L1e can be reduced so as to reduce the amount of various off-axial aberrations.

In addition, the positive lens G21e is a lens through which an off-axial ray passes at a large height and which contributes mainly to the correction of spherical aberration and coma. Accordingly, the lens surface of the positive lens G21e on the object side can have an aspheric shape in which the positive refractive index becomes smaller toward the marginal portion thereof. Thus, spherical aberration and coma can be appropriately corrected.

In addition, the image side surface of the positive lens G21e and the image side surface of the positive lens G22e can be made aspheric, so that various aberrations can be appropriately corrected and the second lens unit L2e can be configured with two lens elements.

With the above-described configuration of the second lens unit L2e, it is easy to reduce the thickness of the second lens unit L2e so as to readily shorten the total length of the optical system and to shorten the total length of lens units during lens retraction.

In each exemplary embodiment, the first lens unit L1a-e includes one negative lens G11a-e and one positive lens G12a-e, in order from the object side to the image side. Here, let the refractive index of a material of the negative lens G11a-e be n1, the refractive index of a material of the positive lens G12a-e be n2, the focal length of the first lens unit L1a-e be f1, and the power of an air lens between the negative lens G11a-e and the positive lens G12a-e be φair. In addition, let a radius of curvature of the surface of the negative lens G11a-e on the object side be r1a, a radius of curvature of the surface of the negative lens G11a-e on the image side be r1b, a radius of curvature of the surface of the positive lens G12a-e on the object side be r2a, and a radius of curvature of the surface of the positive lens G12a-e on the image side be r2b.

In addition, let the focal length of the negative lens G11a-e be f11 and the focal length of the positive lens G12a-e be f12.

In addition, let the thickness of the first lens unit L1a-e along the optical axis be D1. Then, at least one of the following conditions is satisfied.

$$0.10 < n2 - n1 < 0.35 \quad (1)$$

$$-0.80 < \phi air \cdot f1 < -0.10 \quad (2)$$

$$-50 < (r1b + r2a)/(r1b - r2a) < -8 \quad (3)$$

$$0.25 < (r1a + r2b)/(r1a - r2b) < 0.80 \quad (4)$$

$$-0.45 < f11/f12 < -0.32 \quad (5)$$

$$-0.30 < D1/f1 < -0.15 \quad (6)$$

A technical significance of each conditional expression is described below.

The conditional expression (1) is related to the difference between the refractive index of a material of the negative lens G11a-e of the first lens unit L1a-e and the refractive index of a material of the positive lens G12a-e of the first lens unit L1a-e.

If the difference of the refractive index becomes small exceeding a lower limit value of the conditional expression (1), the radius of curvature of the negative lens G11a-e of the surface on the object side becomes large. Accordingly, this facilitates miniaturizing the entire lens system. However, in this case, the Petzval sum becomes large, and it is difficult to correct the tilt of an image plane.

In addition, if the difference in the refractive index becomes large exceeding an upper limit value of the conditional expression (1), the Petzval sum becomes large and the radius of curvature of the negative lens G11a-e on the object side becomes small. This is less useful in miniaturizing the entire lens system. In addition, if the radius of curvature becomes small, coma occurs in the first lens unit L1a-e. In order to correct coma, it is useful to increase the number of lens elements of the second lens unit L2a-e. Accordingly, the size of the entire lens system becomes large.

In addition, the range of the values in the conditional expression (1) can be altered as follows:

$$0.14 < n2 - n1 < 0.33 \quad (1a)$$

The conditional expression (2) defines the ratio of the power of the air lens in the first lens unit L1a-e to the power of the first lens unit L1a-e.

If the positive power of the air lens becomes small exceeding an upper limit of the conditional expression (2), it can become difficult to correct spherical aberration at the telephoto end. In order to correct spherical aberration, it is useful to enlarge the interval between the negative lens G11a-e and the positive lens G12a-e. As a result, the entire lens system becomes large.

If the positive power of the air lens becomes large exceeding a lower limit of the conditional expression (2), it becomes difficult to correct spherical aberration at the wide-angle end. In order to correct spherical aberration, it is useful to shorten the interval between the negative lens G11a-e and the positive lens G12a-e. As a result, it is difficult to miniaturize the entire lens system.

In addition, the range of the values in the conditional expression (2) can be altered as follows:

$$-0.75 < \phi air \cdot f1 < -0.15 \quad (2a)$$

The conditional expressions (3) and (4) define the lens shape of the entire first lens unit L1a-e.

If the shape of the air lens varies exceeding a lower limit of the conditional expression (3) or if the shapes of surfaces of the first lens unit L1a-e on the object side and on the image side vary exceeding a lower limit of the conditional expression (4), it becomes difficult to correct spherical aberration at the telephoto end.

If the shape of the air lens varies exceeding an upper limit of the conditional expression (3) or if the shapes of surfaces of the first lens unit L1a-e on the object side and on the image side vary exceeding an upper limit of the conditional expression (4), it becomes difficult to correct spherical aberration. In order to correct spherical aberration, it is useful to enlarge the interval between the negative lens G11a-e and the positive lens G12a-e. As a result, the entire lens system becomes large.

In addition, the range of the values in the conditional expressions (3) and (4) can be altered as follows:

$$-45 < (r1b + r2a)/(r1b - r2a) < -10 \quad (3a)$$

$$0.30 < (r1a + r2b)/(r1a - r2b) < 0.70 \quad (4a)$$

The conditional expression (5) defines the ratio of the focal length of the negative lens G11a-e to that of the positive lens G12a-e.

If the power of the negative lens G11a-e becomes small exceeding a lower limit of the conditional expression (5), it becomes difficult to correct various off-axial aberrations.

In addition, if the power of the negative lens G11a-e becomes large exceeding an upper limit of the conditional expression (5), the outer diameter of the zoom lens becomes large. Accordingly, the entire lens system becomes large.

In addition, the range of the values in the conditional expression (5) can be altered as follows:

$$-0.44 < f11/f12 < 0.33 \quad (5a)$$

The conditional expression (6) defines the thickness of the first lens unit L1a-e along the optical axis.

If the thickness of the first lens unit L1a-e becomes large exceeding a lower limit of the conditional expression (6), it becomes difficult to correct spherical aberration. In addition, the total length of retracted lens units becomes long. Accordingly, this is less useful in miniaturizing the entire lens system.

In addition, if the focal length f1 becomes large exceeding an upper limit of the conditional expression (6), miniaturization of the entire lens system can be effectively implemented from a point of view of the thickness of the first lens unit L1a-e. However, in this case, various off-axial aberrations, especially, astigmatism, becomes large and it becomes difficult to secure a given angle of view. Accordingly, this is not desirable.

In addition, the range of the values in the conditional expression (6) can be altered as follows:

$$-0.26 < D1/f1 < -0.20 \quad (6a)$$

Numerical examples 1 through 5 that respectively correspond to the first through the fifth exemplary embodiment are set forth below. In the numerical examples 1 through 5, "i" stands for the order of a surface from the object side, "Ri" stands for a radius of curvature of the i-th lens surface (surface), "Di" stands for a lens thickness or an air space between the i-th surface and the (i+1)th surface, "Ni" and "vi" respectively stand for a refractive index and an Abbe number of the i-th material with respect to d-line light.

In addition, two surfaces closest to the image side are a glass material such as a face plate. In addition, "k" stands for a conic coefficient, and each of "B", "C", "D", and "E" stands for an aspheric coefficient. The aspheric shape is expressed as $$x = (h^2/R)/[1 + \{1 - (1+k)(h/R)^2\}^{1/2}] + Bh^4 + Ch^6 + Dh^8 + Eh^{10}$$

where "x" denotes a displacement from a surface vertex along the optical axis in a position at a height "h" from the optical axis, and "R" stands for a paraxial radius of curvature.

In addition, "e-0x" stands for "x10$^{-x}$." "f" stands for the focal length, "Fno" stands for the F number, and "ω" stands for the semifield angle.

In addition, the relationship between each conditional expression described above and each numerical example is set forth in Table 1.

Numerical Example 1
f = 5.66-21.51  Fno = 3.18-5.97  2ω = 55.6°-15.8°

| R1 = −28.404 | D1 = 0.70 | N1 = 1.638539 | v1 = 55.4 |
|---|---|---|---|
| R2 = 7.053 | D2 = 0.65 | | |
| R3 = 7.505 | D3 = 1.80 | N2 = 1.846660 | v2 = 23.9 |
| R4 = 11.801 | D4 = Variable | | |
| R5 = Stop | D5 = 0.44 | | |
| R6 = 27.092 | D6 = 1.40 | N3 = 1.834000 | v3 = 37.2 |
| R7 = −62.667 | D7 = 0.10 | | |
| R8 = 6.296 | D8 = 2.15 | N4 = 1.701536 | v4 = 41.2 |
| R9 = −13.179 | D9 = 2.00 | N5 = 1.805181 | v5 = 25.4 |
| R10 = 4.967 | D10 = 2.96 | | |
| R11 = 12.800 | D11 = 1.20 | N6 = 1.834807 | v6 = 42.7 |
| R12 = −2062.312 | D12 = Variable | | |
| R13 = 16.420 | D13 = 1.50 | N7 = 1.516330 | v7 = 64.1 |
| R14 = −54.239 | D14 = Variable | | |
| R15 = ∞ | D15 = 1.30 | N8 = 1.516330 | v8 = 64.1 |
| R16 = ∞ | | | |

| | Focal Length | | |
|---|---|---|---|
| Variable Space | 5.66 | 13.57 | 21.51 |
| D4 | 20.87 | 6.32 | 2.49 |
| D12 | 3.95 | 13.31 | 22.67 |
| D14 | 3.96 | 3.94 | 3.92 |

Numerical Example 2
f = 5.66-21.34  Fno = 3.18-5.96  2ω = 55.6°-15.9°

| R1 = −23.325 | D1 = 0.70 | N1 = 1.583126 | v1 = 59.4 |
|---|---|---|---|
| R2 = 7.118 | D2 = 0.72 | | |
| R3 = 7.512 | D3 = 1.80 | N2 = 1.846660 | v2 = 23.9 |
| R4 = 10.845 | D4 = Variable | | |
| R5 = Stop | D5 = 0.45 | | |
| R6 = 27.918 | D6 = 1.40 | N3 = 1.882997 | v3 = 40.8 |
| R7 = −62.667 | D7 = 0.10 | | |
| R8 = 6.361 | D8 = 2.15 | N4 = 1.701536 | v4 = 41.2 |
| R9 = −14.301 | D9 = 2.00 | N5 = 1.805181 | v5 = 25.4 |
| R10 = 4.983 | D10 = 2.89 | | |
| R11 = 12.545 | D11 = 1.20 | N6 = 1.834807 | v6 = 42.7 |
| R12 = 2057.675 | D12 = Variable | | |
| R13 = 16.350 | D13 = 1.50 | N7 = 1.516330 | v7 = 64.1 |
| R14 = −44.925 | D14 = Variable | | |
| R15 = ∞ | D15 = 1.30 | N8 = 1.516330 | v8 = 64.1 |
| R16 = ∞ | | | |

-continued

Numerical Example 2
f = 5.66-21.34 Fno = 3.18-5.96 2ω = 55.6°-15.9°

|  | Focal Length | | |
|---|---|---|---|
| Variable Space | 5.66 | 13.47 | 21.34 |
| D4 | 20.67 | 5.97 | 2.22 |
| D12 | 3.97 | 13.06 | 22.21 |
| D14 | 3.73 | 3.70 | 3.62 |

Numerical Example 3
f = 5.66-21.34 Fno = 3.18-5.96 2ω = 55.6°-15.9°

| R1 = −20.461 | D1 = 0.70 | N1 = 1.518229 | ν1 = 58.9 |
|---|---|---|---|
| R2 = 7.144 | D2 = 0.74 | | |
| R3 = 7.509 | D3 = 1.80 | N2 = 1.846660 | ν2 = 23.9 |
| R4 = 10.165 | D4 = Variable | | |
| R5 = Stop | D5 = 0.12 | | |
| R6 = 28.847 | D6 = 1.40 | N3 = 1.882997 | ν3 = 40.8 |
| R7 = −62.667 | D7 = 0.10 | | |
| R8 = 6.434 | D8 = 2.15 | N4 = 1.701536 | ν4 = 41.2 |
| R9 = −15.430 | D9 = 2.00 | N5 = 1.805181 | ν5 = 25.4 |
| R10 = 5.071 | D10 = 2.76 | | |
| R11 = 12.388 | D11 = 1.20 | N6 = 1.834807 | ν6 = 42.7 |
| R12 = 713.961 | D12 = Variable | | |
| R13 = 16.885 | D13 = 1.50 | N7 = 1.516330 | ν7 = 64.1 |
| R14 = −38.334 | D14 = Variable | | |
| R15 = ∞ | D15 = 1.30 | N8 = 1.516330 | ν8 = 64.1 |
| R16 = ∞ | | | |

|  | Focal Length | | |
|---|---|---|---|
| Variable Space | 5.66 | 13.42 | 21.34 |
| D4 | 21.26 | 6.31 | 2.32 |
| D12 | 3.95 | 12.46 | 21.10 |
| D14 | 3.49 | 3.40 | 3.19 |

Numerical Example 4
f = 7.60-21.60 Fno = 2.90-5.00 2ω = 60.6°-23.2°

| R1 = −47.076 | D1 = 0.80 | N1 = 1.622992 | ν1 = 58.2 |
|---|---|---|---|
| R2 = 7.227 | D2 = 1.60 | | |
| R3 = 7.806 | D3 = 1.40 | N2 = 1.846660 | ν2 = 23.9 |
| R4 = 10.333 | D4 = Variable | | |
| R5 = Stop | D5 = 0.50 | | |
| R6 = 6.019 | D6 = 2.50 | N3 = 1.772499 | ν3 = 49.6 |
| R7 = −22.273 | D7 = 0.50 | N4 = 1.647689 | ν4 = 33.8 |
| R8 = 4.928 | D8 = 0.89 | | |
| R9 = 14.410 | D9 = 0.70 | N5 = 1.846660 | ν5 = 23.9 |
| R10 = 7.836 | D10 = 1.55 | N6 = 1.806098 | ν6 = 40.9 |
| R11 = −50.120 | D11 = Variable | | |
| R12 = 183.007 | D12 = 1.60 | N7 = 1.487490 | ν7 = 70.2 |
| R13 = −21.208 | D13 = Variable | | |
| R14 = ∞ | D14 = 2.46 | N8 = 1.516330 | ν8 = 64.1 |
| R15 = ∞ | | | |

|  | Focal Length | | |
|---|---|---|---|
| Variable Space | 7.60 | 14.76 | 21.60 |
| D4 | 13.97 | 4.09 | 1.70 |
| D11 | 5.34 | 10.69 | 20.40 |
| D13 | 5.48 | 7.27 | 4.69 |

Aspheric Coefficients

| R6: | k = −1.73110e+00 | B = 7.31010e−04 | C = −1.59673e−07 |
|---|---|---|---|
| | D = 0.00000e+00 | E = 0.00000e+00 | |
| R13: | k = −1.26766e+00 | B = −1.55573e−05 | C = −2.81850e−07 |
| | D = 0.00000e+00 | E = 0.00000e+00 | |

Numerical Example 5
f = 6.46-14.50 Fno = 4.10-6.30 2ω = 57.6°-27.5°

| R1 = −25.153 | D1 = 0.83 | N1 = 1.701536 | ν1 = 41.2 |
|---|---|---|---|
| R2 = 5.097 | D2 = 0.86 | | |
| R3 = 6.159 | D3 = 0.90 | N2 = 1.846660 | ν2 = 23.9 |
| R4 = 10.875 | D4 = Variable | | |
| R5 = 3.898 | D5 = 2.52 | N3 = 1.589130 | ν3 = 61.1 |
| R6 = −16.011 | D6 = 0.05 | | |
| R7 = 8.390 | D7 = 0.74 | N4 = 1.922860 | ν4 = 18.9 |
| R8 = 4.790 | D8 = 1.30 | | |
| R9 = ∞ | D9 = Variable | | |
| R10 = ∞ | D10 = 1.31 | N5 = 1.516330 | ν5 = 64.1 |
| R11 = ∞ | | | |

|  | Focal Length | | |
|---|---|---|---|
| Variable Space | 6.46 | 10.48 | 14.50 |
| D4 | 13.97 | 4.09 | 1.70 |
| D9 | 6.78 | 9.68 | 12.59 |

Aspheric Coefficients

| R5: | k = −1.54961e+00 | B = 2.78527e−03 | C = 3.51985e−04 |
|---|---|---|---|
| | D = −1.17970e−04 | E = 1.75396e−05 | |
| R6: | k = 1.95578e+01 | B = 2.44082e−03 | C = 1.24124e−04 |
| | D = 7.84440e−05 | E = −8.30636e−06 | |
| R8: | k = −1.73700e−01 | B = 2.12669e−03 | C = 7.91434e−04 |
| | D = −4.56955e−04 | E = 7.40272e−05 | |

TABLE 1

| | | | Numerical Example | | | | |
|---|---|---|---|---|---|---|---|
| | LLV | ULV | 1 | 2 | 3 | 4 | 5 |
| Condition (1) | 0.10 | 0.35 | 0.208 | 0.264 | 0.328 | 0.224 | 0.145 |
| Condition (2) | −0.80 | −0.10 | −0.421 | −0.543 | −0.713 | −0.553 | −0.164 |
| Condition (3) | −50.0 | −8.0 | −32.2 | −37.1 | −40.1 | −26.0 | −10.6 |
| Condition (4) | 0.25 | 0.80 | 0.413 | 0.365 | 0.336 | 0.640 | 0.396 |
| Condition (5) | −0.45 | −0.32 | −0.430 | −0.401 | −0.391 | −0.333 | −0.387 |
| Condition (6) | −0.30 | −0.20 | −0.217 | −0.222 | −0.210 | −0.256 | −0.253 |

In each exemplary embodiment, with each element set as described above, a zoom lens especially suitable to a shooting system that uses a solid-state image sensor can be obtained.

In particular, a zoom lens can be implemented that has a small number of constituent lens elements, is small in size, is suitable to a retractable type zoom lens, appropriately corrects various aberrations other than distortion with a zoom ratio of about 2 to about 4, and has a high optical performance.

In addition, according to the exemplary embodiments described above, with the refractive power of the first lens unit L1a-e and the second lens unit L2a-e appropriately set, correction can be effectively performed on various off-axial aberrations, especially, field curvature, astigmatism, coma, and spherical aberration, in the case where the zoom lens has a large aperture ratio.

In addition, in each exemplary embodiment, since no aspheric lens is used for the first lens unit L1a-e, the total number of aspheric lenses of the zoom lens can be reduced to facilitate manufacturing of lenses.

Note that a zoom lens according to each exemplary embodiment described above can be configured with a premise that distortion can be corrected by image processing. However, the zoom lens can also be used for a camera in which distortion does not matter, such as a monitoring camera.

An exemplary embodiment of a digital camera (an example of an optical apparatus) that uses, as a shooting optical system, a zoom lens according to an exemplary embodiment of the present invention is described below with reference to FIG. 21.

Referring to FIG. 21, the digital camera includes a digital camera body 20 and a shooting optical system 21. The shooting optical system 21 includes a zoom lens according to any of the first to the fifth exemplary embodiments described above. The digital camera body 20 includes an image sensor 22, such as a CCD, configured to receive light forming an object image via the shooting optical system 21. The digital camera body 20 further includes a recording unit 23 configured to record the object image formed on the image sensor 22 and a viewfinder 24 configured to allow a user to observe an object image displayed on a display unit (not shown).

The display unit includes a panel (e.g., a liquid crystal panel) configured to display an object image formed on the image sensor 22.

With a zoom lens according to an exemplary embodiment of the present invention applied to an optical apparatus, such as a digital camera, an image pickup apparatus that is small in size and has a high optical performance can be implemented.

According to an exemplary embodiment, a zoom lens can be implemented that has a small number of constituent lens elements, is small in size, corrects various aberrations other than distortion, and has a high optical performance. Also, an image pickup apparatus having that zoom lens can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-337029 filed Nov. 22, 2005, which is hereby incorporated by reference herein in its entirety.

What is claimed is:

1. A zoom lens comprising, in order from an object side to an image side:

a first lens unit having a negative refractive power; and a second lens unit having a positive refractive power, wherein an interval between the first lens unit and the second lens unit changes during zooming, wherein the first lens unit includes, in order from the object side to the image side, a negative lens and a positive lens, wherein a refractive index of a material of the negative lens (n1), a refractive index of a material of the positive lens (n2), a focal length of the first lens unit (f1), a power of an air lens between the negative lens and the positive lens ($\phi$air), the negative lens having a radius of curvature (r1a) of its surface facing the object side, the negative lens having a radius of curvature (r1b) of its surface facing the image side, the positive lens having a radius of curvature (r2a) of its surface facing the object side, the positive lens having a radius of curvature (r2b) of its surface facing the image side satisfy the following conditions:

$0.10 < n2 - n1 < 0.35$ $-0.80 < \phi air \cdot f1 < -0.10$ $-50 < (r1b + r2a)/(r1b - r2a) < -8$ $0.25 < (r1a + r2b)/(r1a - r2b) < 0.80$.

2. The zoom lens according to claim 1, wherein during zooming from a wide-angle end to a telephoto end, the first lens unit moves with a locus convex toward the image side and the second lens unit moves toward the object side monotonously.

3. The zoom lens according to claim 1, wherein both lens surfaces of the negative lens are in a concave shape, and wherein the positive lens is in a meniscus shape having a convex lens surface facing the object side.

4. The zoom lens according to claim 1, wherein a focal length (f11) of the negative lens and a focal length (f12) of the positive lens satisfy the following condition:

$-0.45 < f11/f12 < -0.32$.

5. The zoom lens according to claim 1, wherein a focal length (f1) of the first lens unit and a thickness (D1) of the first lens unit along an optical axis satisfy the following condition:

$-0.30 < D1/f1 < -0.15$.

6. The zoom lens according to claim 1, wherein the second lens unit includes, in order from the object side to the image side, a second positive lens, a third positive lens, a second negative lens, and a fourth positive lens.

7. The zoom lens according to claim 1, wherein the second lens unit includes, in order from the object side to the image side, a second positive lens, a second negative lens, a third negative lens, and a third positive lens.

8. The zoom lens according to claim 1, wherein the second lens unit includes, in order from the object side to the image side, a second positive lens and a second negative lens.

9. The zoom lens according to claim 1, further comprising, on the image side of the second lens unit, a third lens unit having a positive refractive power configured to move during zooming.

10. The zoom lens according to claim 9, wherein the third lens unit includes a single lens element.

11. An image pickup apparatus comprising:

a photoelectric conversion element; and a zoom lens configured to guide a light flux from an object to the photoelectric conversion element, wherein the zoom lens comprises, in order from the object side to the photoelectric conversion element side:

a first lens unit having a negative refractive power; and a second lens unit having a positive refractive power, wherein an interval between the first lens unit and the second lens unit changes during zooming, wherein the first lens unit includes, in order from the object side to the photoelectric conversion element side, a negative lens and a positive lens, wherein a refractive index of a material of the negative lens ($n1$), a refractive index of a material of the positive lens ($n2$), a focal length of the first lens unit ($f1$), a power of an air lens between the negative lens and the positive lens ($\phi$air), the negative lens having a radius of curvature ($r1a$) of its surface facing the object side, the negative lens having a radius of curvature ($r1b$) of its surface facing the photoelectric conversion element side, the positive lens having a radius of curvature ($r2a$) of its surface facing the object side, the positive lens having a radius of curvature ($r2b$) of its surface facing the photoelectric conversion element side satisfy the following conditions:

$$0.10 < n2 - n1 < 0.35$$

$$-0.80 < \phi\text{air} \cdot f1 < -0.10$$

$$-50 < (r1b + r2a)/(r1b - r2a) < -8$$

$$0.25 < (r1a + r2b)/(r1a - r2b) < 0.80.$$

* * * * *